United States Patent [19]

Terashita et al.

[11] Patent Number: 5,073,008
[45] Date of Patent: Dec. 17, 1991

[54] MULTICOLOR INTERFERENCE FILTERS WITH SIDE SURFACES TO PREVENT ENTRY OF UNDESIRABLE LIGHT

[75] Inventors: Takaaki Terashita; Setsuo Okada, both of Kanagawa, Japan

[73] Assignee: Fuji Photo Film Co., Ltd., Kanagawa, Japan

[21] Appl. No.: 668,331

[22] Filed: Mar. 14, 1991

Related U.S. Application Data

[63] Continuation of Ser. No. 282,368, Dec. 9, 1988, abandoned.

[30] Foreign Application Priority Data

Dec. 11, 1987 [JP] Japan .................. 62-313761
Dec. 11, 1987 [JP] Japan .................. 62-313762
Dec. 11, 1987 [JP] Japan .................. 62-313763

[51] Int. Cl.$^5$ .................................. G02B 5/28
[52] U.S. Cl. .................................. 359/589; 250/226
[58] Field of Search ............. 350/163, 164, 166, 1.6, 350/1.7; 250/226

[56] References Cited

U.S. PATENT DOCUMENTS

| | | | |
|---|---|---|---|
| 3,771,857 | 11/1973 | Thomasson et al. | 350/166 |
| 3,986,069 | 10/1976 | Funahashi | 350/166 |
| 4,003,635 | 1/1977 | Ottersberg et al. | 350/166 |
| 4,029,394 | 6/1977 | Araki | 350/166 |
| 4,352,006 | 9/1982 | Zega | 350/1.7 |
| 4,355,866 | 10/1982 | Tanaka et al. | 350/164 |
| 4,395,629 | 7/1983 | Sasano et al. | 350/166 |
| 4,488,775 | 12/1984 | Yamamoto | 350/1.7 |
| 4,556,277 | 12/1985 | Fan et al. | 350/1.7 |
| 4,634,242 | 1/1987 | Taguchi et al. | 350/166 |
| 4,784,467 | 11/1988 | Akatsuka et al. | 350/164 |
| 4,794,033 | 12/1988 | Ooi | 350/164 |
| 4,815,821 | 3/1989 | Nonogaki et al. | 350/164 |
| 4,822,998 | 4/1989 | Yokota et al. | 350/166 |

FOREIGN PATENT DOCUMENTS 442542 3/1963 Japan .

Primary Examiner—Bruce Y. Arnold
Assistant Examiner—Martin Lerner
Attorney, Agent, or Firm—Sughrue, Mion, Zinn, Macpeak & Seas

[57] ABSTRACT

An interference filter includes a multi-coated interference filter layer of dielectric substances deposited on a transparent base plate and extinction members applied to side surfaces of the transparent base plate. A multi-color interference filter has at least two such interference filters having different spectral characteristics closely connected to each other through the extinction members and cemented to a transparent base plate which is formed with a multi-coated anti-reflection layer deposited on one surface opposite to a surface to which the interference filter is cemented.

15 Claims, 6 Drawing Sheets

Prior Art

MULTICOLOR INTERFERENCE FILTERS WITH SIDE SURFACES TO PREVENT ENTRY OF UNDESIRABLE LIGHT

This is a continuation of application Ser. No. 282,368 filed Dec. 9, 1988, now abandoned. su

BACKGROUND OF THE INVENTION

The present invention relates to an interference filter used in a color sensor.

Color sensors, generally comprising color filters in combination with photoelectric conversion elements, are used to measure three primary colors of light, to distinguish colors of measured materials, or to measure color temperature. Such color sensors are classified into two groups; mono-color sensors and integral multi-color sensors. A mono-color sensor comprises a single mono-color filter and a single photoelectric conversion element in combination and can measure a specific color. On the other hand, an integral type multi-color sensor, which is generally used in color regulators of copy machines or various kinds of color sensors, uses a plurality of photoelectric conversion elements arranged side by side on a sensor plate and as many color filters as the photoelectric conversion elements are provided, one color filter for each photoelectric conversion element to measure a plurality of colors of light at once.

In an exemplary color regulator disclosed in Japanese Patent Publication No. 44-2524, two multi-color filters are used to regulate linearly the color balance of light. The multi-color filter includes two filter sections of different primary colors, respectively and a non-colored transparent section between the two filter sections, all sections being formed side by side on a transparent base plate.

For these color filters, colored filters or interference filters are available. Such known colored filters comprise a gelatine film or a transparent plastic film mixed with organic dyes or pigments, or a glass colored with metallic oxides or colloidal metals. It is difficult with these colored filters to provide desired spectral characteristics of filtered light or to provide a sharp spectral characteristic and a high transmittance. However, they are inexpensive and can be dealt with easily.

Interference filters are made by forming thin interference layers of metals and/or dielectric substances on transparent base plates, such as glass plates, in an evaporation or sputtering process. Such an interference filter can be adapted to transmit a specific range of wavelengths of light therethrough by controlling the thickness of each of or all of the interference layers. The interference filters do not have the same problems as colored filters. They provide fine spectral characteristics and make it possible to reduce the size of photoelectric conversion elements and hence the color sensors.

In manufacturing the multi-color filter disclosed in the above Japanese Patent Publication by the use of interference filter layers, it is necessary to repeat the masking of a transparent base plate three times and the evaporation of substances four times. In more detail, the transparent base plate, after masking the transparent base plate with a masking member leaving one side section of three parallel sections uncovered, is formed with a multi-layer interference filter comprising a plurality of thin layers of two different dielectric substances, such as titanic oxide and silicon oxide alternately deposited on the first uncovered section thereof in a vacuum deposition method. This multi-layer interference filter serves as, for example, a magenta filter for transmitting blue and red components of light. In the same way, the transparent base plate is masked to cover the magenta filter section and the central section with a masking member and then is formed with a multi-layer interference filter comprising a plurality of thin layers of titanic oxide and silicon oxide alternately deposited on a second uncovered section. This multi-layer interference filter serves as a yellow filter for transmitting green and red components of light. The transparent base plate is covered with a masking member leaving the central section uncovered and is formed with a layer of a dielectric substance serving as a neutral density (ND) layer deposited on the central section. Finally, the transparent base plate is turned back and is formed with a multi-layer of dielectric substances deposited over the back surface thereof where the multi-layer acts as an anti-reflection layer.

A drawback to the use of such interference filters in color sensors is the entry of light through side surfaces thereof due to the transparent base plate of the interference filter being thick relative to the interference layers. In particular, in the multi-color sensor with a plurality of such interference filters arranged side by side to filter different colors of light, different colors of light passed through, side surfaces of these interference filters are mixed and then reach the photoelectric conversion elements.

Another problem with the conventional multi-color interference filter is the need to perform four vacuum depositions of the interference layers on the transparent base plate. If any one of these different interference layers is unsuccessfully deposited, the whole of the multi-color interference filter should be scrapped. In addition it is difficult to provide the multi-color interference filter with two primary color filter layers with, on the same transparent base plate, each having desired spectral characteristics.

OBJECT OF THE INVENTION

It is, therefore, an object of the present invention to provide an interference filter which can prevent the entry of undesirable light through side surfaces thereof.

It is another object of the present invention to provide a multi-color interference filter which has improved spectral characteristics and is easily manufactured.

SUMMARY OF THE INVENTION

According to one aspect of the present invention there is provided an interference filter comprising a multi-layer interference filter which is deposited on one of the surfaces of a transparent base plate, and extinction members are applied to side surfaces of the transparent base plate. The extinction member is a thin film painted on or a thin sheet attached to the transparent base plate. The thin film or thin sheet is preferably colored either black or substantially the same color as that of light passed through the multi-layer interference filter.

According to another aspect of the present invention there is provided a multi-color interference filter comprising at least two interference filters having different spectral characteristics. Each of the interference filters is formed on a transparent base plate with side surfaces finished as mirror surfaces to which a side surface is closely connected. The interference filters are arranged closely contacted to one another on a transparent base support.

The provision of the extinction member applied to the side surface of the interference filter assists in preventing the entry of undesirable light into the interference filter.

Because it is quite easy to provide interference filters, each of which can be chosen as having the most desirable spectral characteristic among a large number of interference filters, the multi-color interference filter of the present invention can have a more desirable combination of spectral characteristics.

DETAILED DESCRIPTION OF THE INVENTION

Figure 1A:
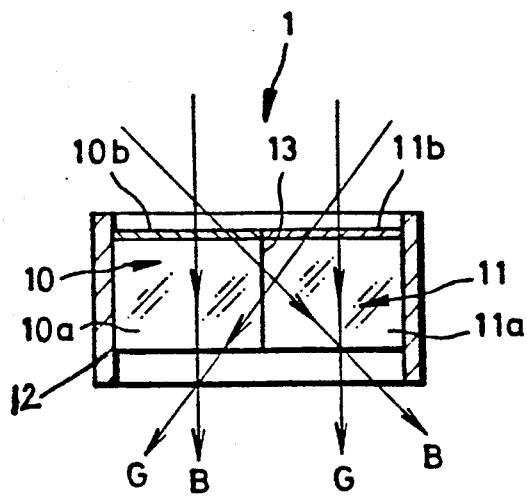
FIGS. 1A to 1D are explanatory illustrations showing various conditions of the entry of undesirable light into interference filters.
Figure 1B:
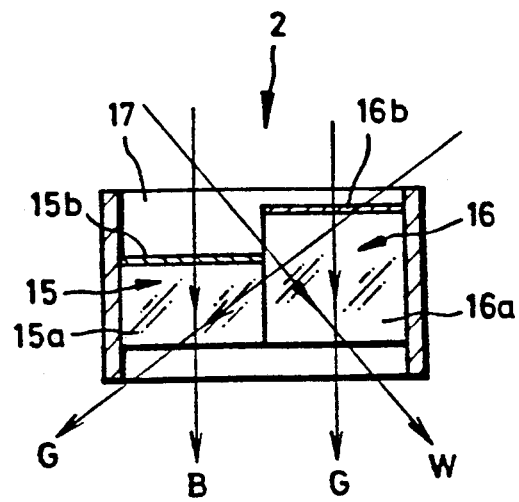
Figure 1C:
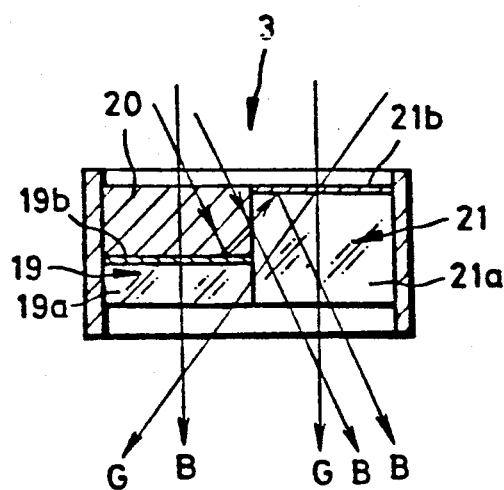
Figure 1D:
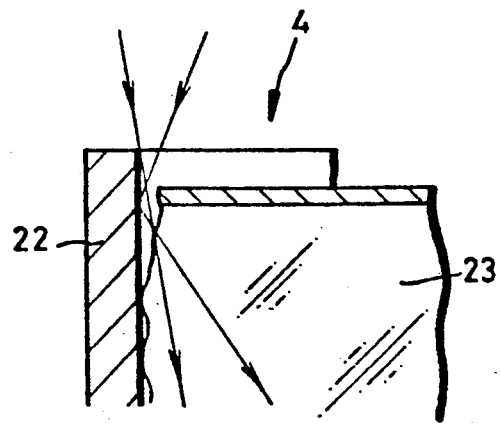
Figure 2:
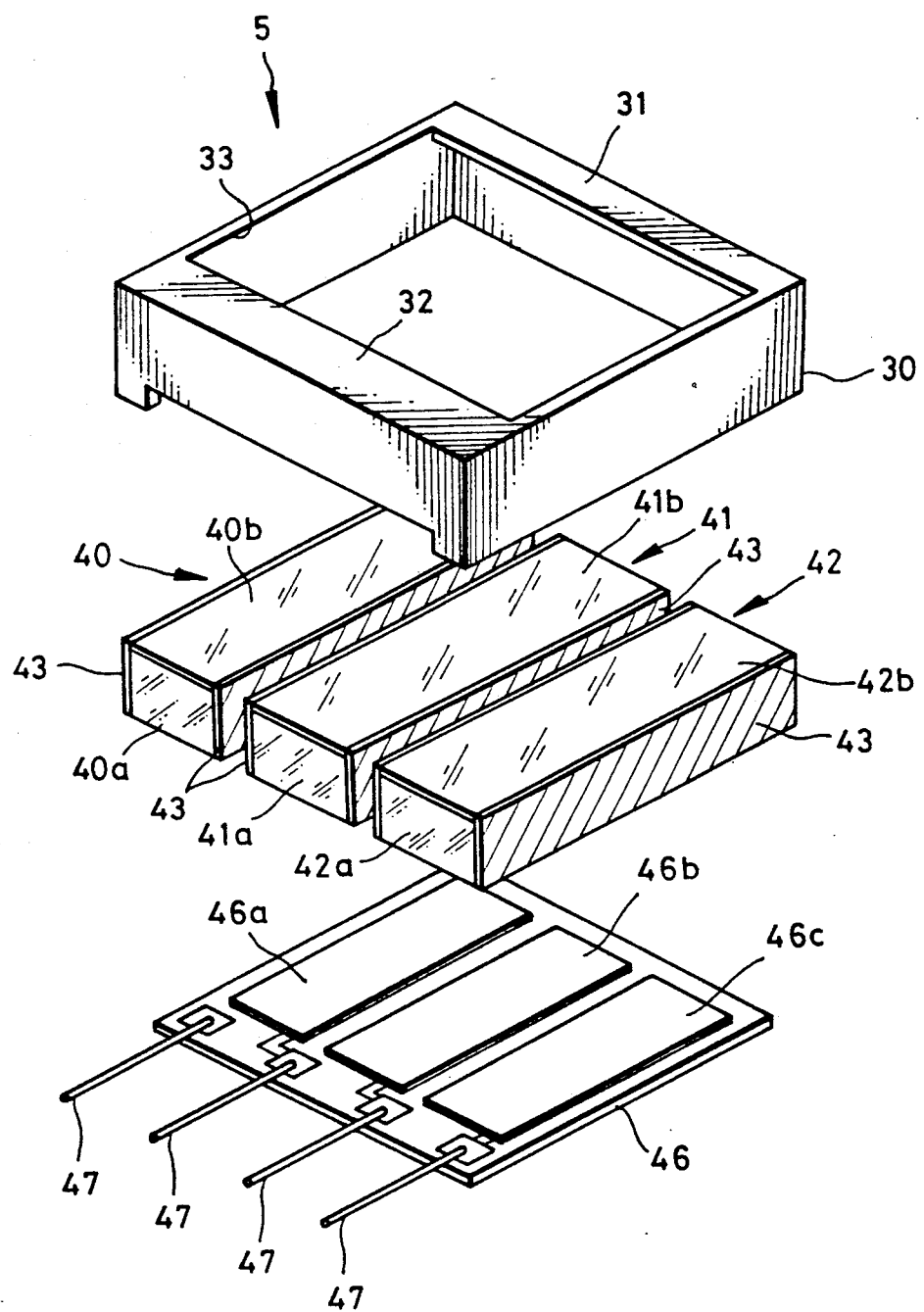
FIG. 2 is an exploded perspective view showing a multi-color sensor using an interference filter according to the present invention.

Before describing the present invention in detail, reference is made to FIGS. 1A to 1D for the purpose of providing a brief background that will enhance an understanding of the operation of an interference filter incorporated in a color sensor shown in FIG. 2. As shown in FIG. 1A, an interference filter assembly 1 includes interference filters 10 and 11 for, for example, blue and green, respectively, which are arranged side by side in a filter holder 12. The interference filter 10 comprises a transparent base plate such as a glass plate 10a and an interference layer 10b deposited over the glass plate 10a. The interference layer 10b comprises a plurality of thin interference layers of metals and/or dielectric substances formed in an evaporation or sputtering process well known in the art. The interference filter 10 reflects repeatedly the incident light thereinto between the thin interference layers to pass therethrough blue light (B) only. Similarly, the interference layer 11b comprises a plurality of thin interference layers of metals and/or dielectric substances formed in an evaporation or sputtering process well known in the art. The interference filter 11 reflects repeatedly the incident light thereinto between the thin interference layers to pass therethrough green light (G) only. Behind the interference filter assembly 1 there is a sensor base plate (not shown) on which a photoelectric conversion element divided into two divisions is disposed. The interference filter assembly 1 allows the entry of light through the blue interference filter 10 at an angle to pass through the interface 13 between the blue and green interference filters 11 and 10 and enter into the green interference filter 11 resulting in the blue light (B) mixing with the green light (G) passing through the green interference filter 11. In the same way, green light (G) entering into the green interference filter 11 at an angle will mix with blue light (B) passing through the blue interference filter 10.

Another interference filter assembly 2 shown in FIG. 1B has a transparent base plate, such as a glass plate 16a with a green interference filter layer 16b deposited thereon and a thinner transparent base plate, such as a glass plate 15a with a blue interference filter layer 15b deposited thereto. This interference filter assembly 2 allows the entry of white light (W) through an open space 17 to pass through the glass plate 16a of the green interference filter 16. Furthermore, the green light (G) entering into the green interference filter 16 at an angle will mix with the blue light (B) passing through the blue interference filter 15.

It is possible to fill the space 17 with a colored glass filter. As is shown in FIG. 1C, an interference filter assembly 3 comprises blue and green interference filters 19 and 21 having a transparent base plate such as a glass plate 21a with a green interference filter layer 21b deposited thereon and a thin transparent base plate, such as a glass plate 19a with a blue interference filter layer 19b deposited thereon. The interference filter assembly 3 is further provided with a blue glass filter 20 cemented to the blue interference filter 19 to fill the space enclosed by the blue and green interference filters 19 and 21. In the interference filter assembly 3, the blue glass filter 20 limits the entry of light within a range of relatively long wavelengths and the blue interference filter 19 limits the entry of light within a range of relatively short wavelengths. The light incident upon the blue interference filter layer 19b at an angle will be reflected back and thereafter it enters into the green interference filter 21 and is reflected by the green interference filter layer 21b. As a result, blue and green light will be mixed after having passed through the green interference filter 21. Light incident upon the green interference filter 21 at an angle will mix with the blue light passed through the blue interference filter 19.

FIG. 1D illustrates a part of an interference filter assembly 4 in which there is undesirably formed a gap between a filter holder 22 and an interference filter 23. Such a gap, which will be produced by an unevenness on a side surface of the interference filter 23, allows light to enter into the interference filter 23 therethrough.

In each case described above, light entering an interference filter passing either through a side surface or an interface between two interference filters arranged side by side will not cause serious problems in the case of a large surface area of the interference filter, but, will cause serious problems in the case of a small surface area of the interference filter.

Figure 3:
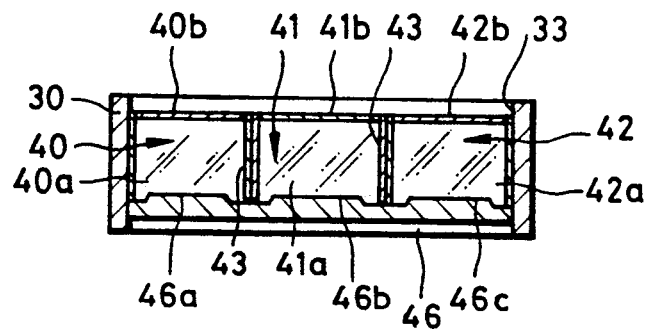
FIG. 3 is a transversal cross sectional view of the multi-color sensor of FIG. 2.
Figure 4:
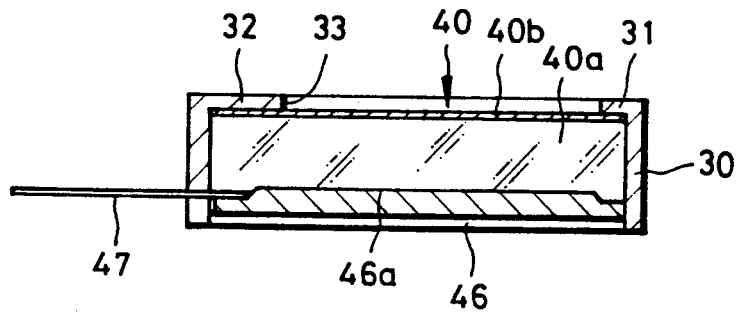
FIG. 4 is a longitudinal cross sectional view of the multi-color sensor of FIG. 2.

Referring now to FIGS. 2 to 4 there is shown an integral type color sensor unit 5 embodying the present invention. As shown, the color sensor assembly 5 includes a unit housing 30 made of plastic material and colored black. An opening 33, formed in housing 30 is defined by flanges 31 and 32 and is opened at the bottom. The housing 30 receives therein three interference filters 40, 41 and 42 for red, green and blue, arranged side by side. Each interference filter 40, 41. 42 comprises a transparent base plate such as a glass plate 40a, 41a, 42a and an interference filter layer 40b, 41b, 42b deposited on the glass plate. Each filter layer consists of a plurality of thin interference layers of metals such as silver or aluminum, and/or dielectric substances such as titanous or titanic oxide or silicon oxide formed on a glass plate in an evaporation or sputtering process.

The red interference filter 40 has deposited on its side surfaces extinction films 43 colored black or red. These extinction films 43 cut light passed through a gap between the red interference filter 40 and the unit housing 30 and light passed through the green interference filter 41, respectively. It is noted that the other interference filters 41 and 42 also have deposited on their side surfaces black or correspondingly colored extinction films 43. Because the lengthwise end surfaces of the each interference filter are covered, and thereby isolated from ambient light, by the flanges 31 and 32 of the unit housing 30 it is not always necessary to deposit them with extinction films 43. In the case where there is no space between adjacent side surfaces of two interference filters, it is permissible to omit the extinction film 43 from either one of the adjacent two side surfaces.

The color sensor unit 5 includes a sensor board 46 attached to the bottom of the interference filters 40-42 and fitted to the unit housing 30. The sensor board 46 has three photosensitive elements 46a-46c provided for the three interference filters 40, 41, 42, respectively. Each photosensitive element 46a, 46b, 46c is provided with a lead wire 47 to utilize electric output from the photosensitive element.

Figure 5:
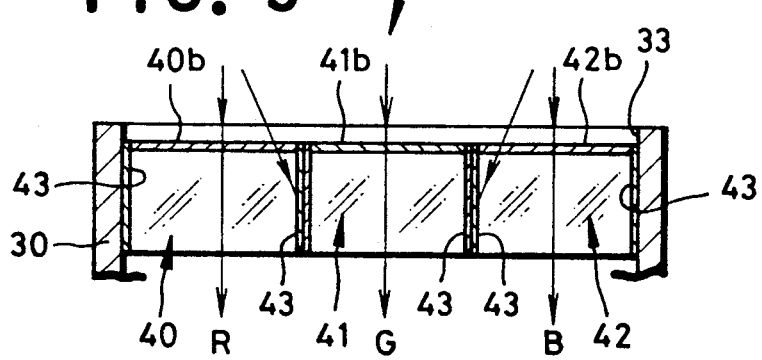
FIG. 5 is an explanatory illustration showing the entry of undesirable light into interference filters of the multi-color sensor of FIG. 2.

The operation of the integrated type color sensor unit 5 will be understood with reference to FIG. 5. The sensor unit 5 can absorb any incident light upon the interference filters 40-42 at an angle by the extinction films 43 deposited on the side surfaces of each interference filter, and thereby prevent the entry of light into the adjacent interference filter.

Figure 6:
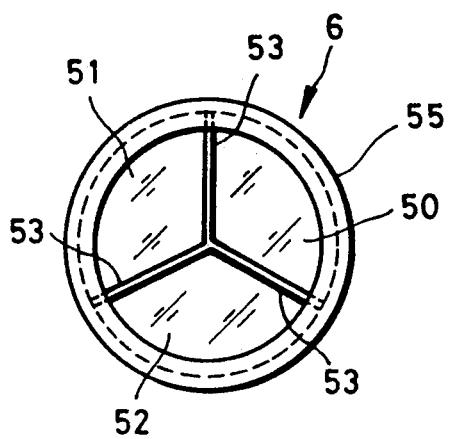
FIG. 6 is another embodiment of a multi-color sensor using interference filters according to the present invention.

Referring now to FIG. 6 showing another integrated type color sensor unit 6 embodying the present invention, the color sensor unit 6 comprises a generally cylindrical tube-shaped unit housing 55 and red, green and blue interference filters 50, 51 and 52 having sector-shaped cross sections and arranged side by side through extinction sheet members 53 and in the form of a cylinder in the unit housing 55. The extinction sheet member may be either adhered to side surfaces of each interference filter prior to assembling the interference filter unit 6 or inserted between each two interference filters upon assembling the interference filter unit 6.

Figure 7:
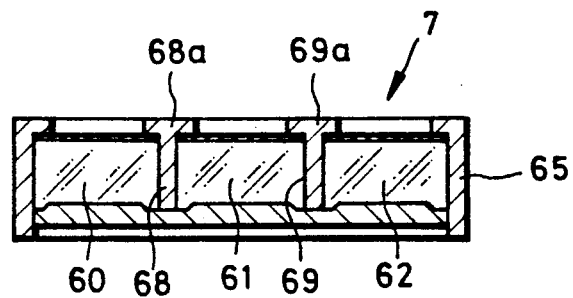
FIG. 7 is still another embodiment of a multi-color sensor using interference filters according to the present invention in which an extinction member is common to partitions of the multi-color sensor.

Referring to FIG. 7 showing still another integrated type color sensor unit 7 embodying the present invention, the color sensor unit 7 comprises a generally rectangular parallelepipedal unit housing 65 provided with extinction walls 68 and 69 and red, green and blue interference filters 60, 61 and 62 in the form of a square pillar separated by the extinction walls 68 and 69 from one another and received in the unit housing 65. At the top of each extinction wall 68, 69 there is provided a strip-like supporting member 68a, 69a for holding down side margins of each interference filter 60, 61, 62 and preventing the entry of light passing through interfaces between the interference filters.

Figure 8:
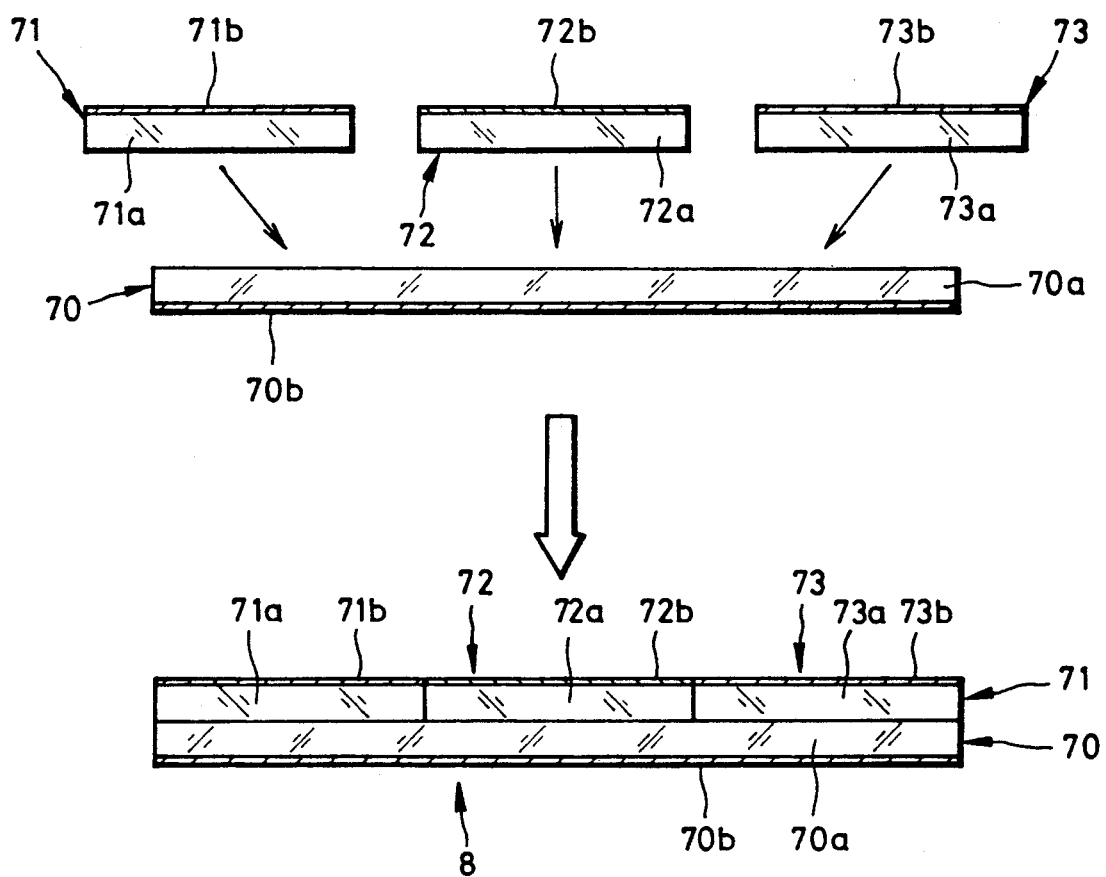
FIG. 8 is an explanatory illustration showing the process of making a multi-color interference filter according to the present invention.
Figure 9:
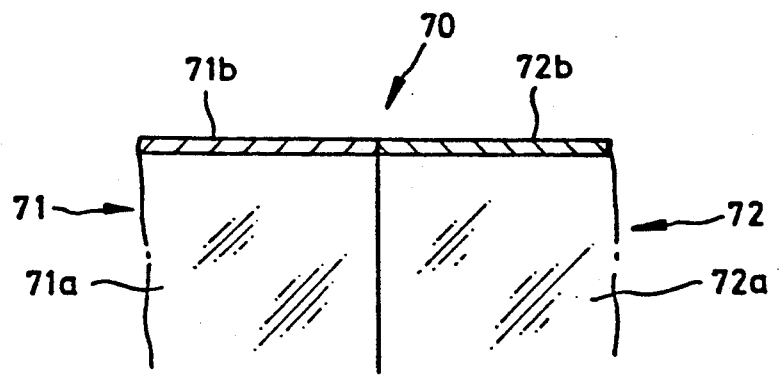
FIG. 9 is an explanatory cross sectional illustration showing the interface between two interference filters of the multi-color interference filter.
Figure 10:
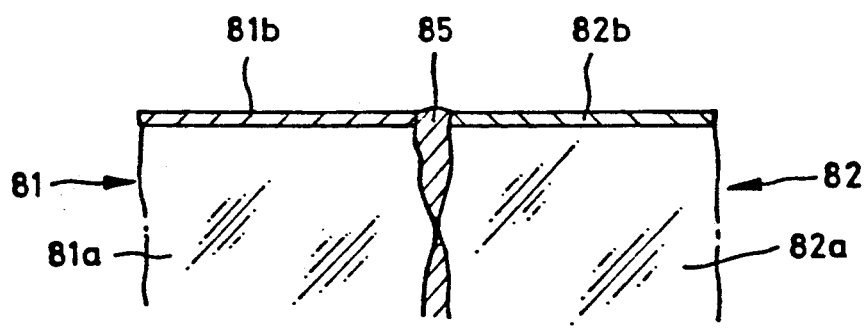
FIG. 10 is an illustration similar to FIG. 9 but showing the interface between two interference filters cemented with an adhesive agent.

Referring now to FIGS. 8 to 10 there is shown a multi-color interference filter 8 embodying the present invention. As shown, the multi-color interference filter 8 comprises an anti-reflection member 70 and three filters, namely a cyan interference filter 71, a neutral density (ND) filter 72 and a yellow interference filter 73. The anti-reflection member 70 comprises a base support 70a made of a transparent glass or plastic plate and an anti-reflection multi-layer 70b comprising a plurality of thin layers of magnesium fluoride and/or zircon oxide formed on the back surface of the base support 70a thereof in a vacuum evaporation or sputtering process.

The cyan interference filter 71 comprises a transparent base plate 71a such as a glass or a transparent plastic plate and a cyan multi-coated interference filter layer 71b for transmitting blue and green components of light and reflecting the other components of light. This cyan multi-coated interference filter layer 71b consists of a plurality of thin interference layers of substances such as metal or dielectric substances formed on the front surface of the transparent base plate 71a in a vacuum evaporation or sputtering process. The cyan multi-coated interference filter layer 71b reflects repeatedly the incident light thereinto between the thin interference layers to pass a specified wavelength range of light therethrough. As is well known in the art, the specific wavelength range can be desirably established by designing the thickness of each thin interference layer of the cyan multi-coated interference filter layer 71b. In the case of forming the cyan multi-coated interference filter layer 71b of dielectric substances it is, for example, formed by depositing interference layers of titanous oxide and of silicon oxide, alternately on the transparent base plate 71a.

Similarly, the yellow interference filter 73 comprises a transparent base plate 73a such as a glass or a transparent plastic plate and a yellow multi-coated interference filter layer 73b for transmitting red and green components of light and reflecting the other components of light. This yellow multi-coated interference filter layer 73b consists of a plurality of thin interference layers of substances such as metals or dielectric substances formed on the front surface of the transparent base plate 73a in a vacuum evaporation or sputtering process. The yellow multi-coated interference filter layer 73b reflects repeatedly the incident light thereinto between the thin interference layers to pass a specified wavelength range of light therethrough. The specific wavelength range can also be desirably established by designing the thickness of each thin interference layer of the yellow multi-coated interference filter layer 73b. In the case of forming the yellow multi-coated interference filter 73b layer of dielectric substances, it is, for example, formed by depositing interference layers of titanous oxide and of silicon oxide, alternately, on the transparent base plate 73a.

The ND filter 72 comprises a transparent base plate 72a such as a glass plate or a transparent plastic plate and a neutral density filter layer 72b for transmitting all the components of light. This neutral density filter layer 72b is formed on the transparent base plate 72a in a vacuum evaporation or a sputtering process.

Among a number of each filters 71, 72, 73 made at once, one which has a desired spectral characteristic is selected. Each one thus selected as the interference filter 71, 72 or an ND filter 72 is cemented to the base support 70a of the anti-reflection member 70 with a transparent adhesive agent, thereby providing the multi-color interference filter 8.

In preparing each filter 71, 72, 73, it is preferred to finish side surfaces of each filter as a mirror surface in order to set the sides of the adjacent filters in close contact to each other. In more detail, irregularities left in the side surface of each filter may not be larger than the wavelengths of visible light (4,000 to 7000 Å). It is more preferable that gaps formed by such irregularities between two adjacent side surfaces be smaller than one half of the wavelength of light, for example 6,328 Å.

Reference is now to FIGS. 9 and 10 for the purpose of comparing the interference filter 70 according to the present invention with a conventional one. FIG. 9 illustrates a part of the multi-color interference filter 78 shown in FIG. 8 showing the interface between the cyan interference filter 71 and the ND filter 72 closely contacted to each other. The side surfaces of these filters 71 and 72, which are finished as mirror surfaces, are contacted to each other through a water layer and then heated to evaporate the water layer thereby securing the filters 71 and 72 side to side.

FIG. 10 illustrates the interface formed between two filters used heretofore. Each filter 81, 82 comprises a transparent base plate 81a, 82a with a multi-coated interference layer 81b, 82b formed thereon. The respective transparent base plates 81a and 82a have their side surfaces left as they are cut. The filters 81 and 82 thus prepared are cemented side to side with a transparent adhesive agent layer 85. The filters thus cemented shown in FIG. 10 allows the entry of light into the adhesive reagent layer 85 and cause the light to scatter therethrough. This leads to ghost images and/or blurred images.

Figure 11:
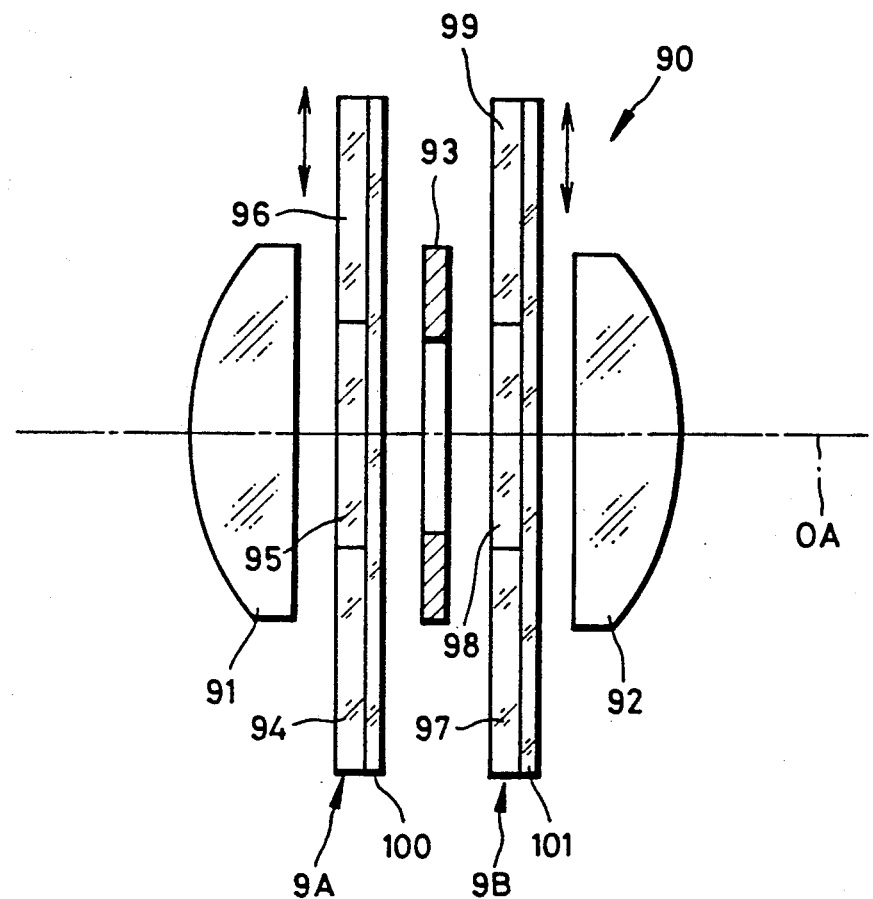
FIG. 11 is a cross sectional view showing a color regulator using multi-color interference filters according to the present invention.

Referring now to FIG. 11, there is shown an optical system of a color regulator to which the multi-color interference filter according to the present invention is applied. The color regulator optical system 90 comprises front and rear lens groups 91 and 92, a pair of generally rectangular plate-like multi-color interference filters 9A and 9B disposed between the front and rear lens groups 91 and 92, a pair of generally rectangular plate-like multi-color interference filters 9A and 9B disposed between the front and rear lens groups 91 and 92, and a diaphragm 93 disposed between the multi-color interference filters 9A and 9B. The multi-color 9A and 9B are almost the same in structure as the multi-color interference filter 8 shown in FIG. 8, but each has yellow and magenta filters 94 and 96 disposed on both sides of an ND filter 95 on an anti-reflection member 100 or cyan and magenta interference filters 97 and 99 disposed on both sides of an ND filter 98 on an anti-reflection member 101. These two multi-color interference filters 9A and 9B are adapted to be movable in a direction perpendicular to the optical axis OA of the color regulator optical system 90 so as to control any one or two of cyan, yellow and magenta components of light.

Figures 12A, 12B, 12C:
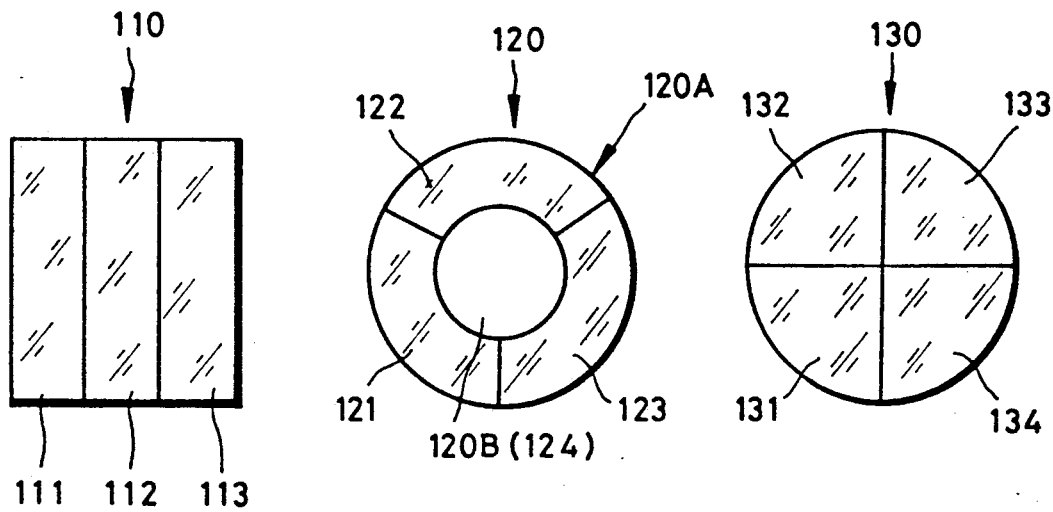
FIGS. 12A to 12C are illustrations showing various arrangements of interference filters of the multi-color interference filters according to the present invention.

The multi-color interference filter of the present invention can be applicable in various forms. As shown in FIG. 12A, a multi-color interference filter 110 comprises three primary color interference filters 111, 112 and 113, i.e. the red, green and blue interference filters, arranged side by side. In one instance, the multi-color interference filter 110 is disposed on a sensor base plate with the transmittal interference filter 111, 112 and 113 overlaid on the photoelectric conversion areas of the sensor base plate, respectively and is used as a multi-color sensor, thereby allowing the multi-color sensor to measure the respective color of light.

FIG. 12B shows another application of the multi-color interference filter of the present invention. As shown, a multi-color interference filter 120 comprises an annular ring interference filter section 120A trisected into red, green and blue transmittal interference filters 121, 122 and 123 arranged in this order and a center filter section 120B which is a white light transmittal ND filter 124.

FIG. 12C is still another application of the multi-color interference filter of the present invention. As shown, a multi-color interference filter 130 is of the form of a disk quartered into red, green and blue transmittal interference filters 131, 132 and 133 and an ND filter 134 arranged in this order. The multi-color interference filter 110, 120, 130 shown in FIG. 12A, 12B, 12C respectively is different in shape from but structurally the same as the multi-color interference filter 8 shown in FIG. 8.

It is noted that although an evaporated anti-reflection member is formed in the form of a thin film on one surface of the transparent base plate of the multi-color interference filter described above, nevertheless such an anti-reflection member may be formed on both surfaces of the transparent base plate of the multi-color interference filter: one for reducing reflection of a relatively long wavelength range of light; the other for reducing reflection of a relatively short wavelength range of light. The multi-color interference filter can provide greatly improved spectral characteristics. It is also noted that any one of those interference filters can be attached into one body to a colored filter so as to provide desired spectral characteristics.

It will, of course, be understood that various changes may be made in the form details, arrangements and proportions of the parts without departing from the scope of the present invention, which generally stated consists in the matter set forth in the accompanying claims.

What is claimed is:

1. An interference filter for preventing entry of undesirable light, comprising:
   a transparent base plate;
   a multi-coated interference filter layer deposited on said transparent base plate;
   extinction members applied to side surfaces of said transparent base plate;
   wherein each of said extinction members is a thin film painted on said side surfaces of said transparent base plate; and
   wherein said thin film painted on said side surfaces of said transparent base plate is colored substantially the same color as that of light passed through said interference filter.

2. An interference filter for preventing entry of undesirable light, comprising:
   a transparent base plate;
   a multi-coated interference filter layer deposited on said transparent base plate;

extinction members applied to side surfaces of said transparent base plate;

wherein each of said extinction members is a thin sheet attached to said side surfaces of said transparent base plate; and wherein said thin sheet attached to said side surfaces of said transparent base plate is colored substantially the same color as that of light passed through said interference filter.

3. A multi-color interference for preventing entry of undesirable light, comprising:

at least two interference filters, having different spectral characteristics, closely connected and horizontally adjacent to each other and cemented on a transparent base support;

wherein said transparent base support has a multi-coated anti-reflection layer deposited on one surface opposite to a surface to which said interference filters are cemented.

4. A multi-color interference filter as defined in claim 3, wherein each said transparent base plate has a side surface finished as a mirror surface.

5. A multi-color interference filter as defined in claim 4, wherein said mirror surface is of a roughness smaller than a wavelength of visible light.

6. A multi-color interference filter as defined in claim 4, wherein said mirror surface is of a roughness smaller than a half of a wavelength of visible light.

7. A multi-color interference filter for preventing entry of undesirable light, comprising:

at least two interference filters, having different spectral characteristics, closely connected and horizontally adjacent to each other and cemented on a transparent base support;

wherein each of said interference filters comprises a separate transparent base plate and a multi-coated interference layer of dielectric substances deposited on said separate transparent base plate;

wherein said transparent base support has a multi-coated anti-reflection layer deposited on one surface opposite to a surface to which said interference filters are cemented.

8. A multi-color interference filter as defined in claim 7, wherein each said transparent base plate has a side surface finished as a mirror surface.

9. A multi-color interference filter as defined in claim 8, wherein said mirror surface is of a roughness smaller than a wavelength of visible light.

10. A multi-color interference filter as defined in claim 8, wherein said mirror surface is of a roughness smaller than a half of a wavelength of visible light.

11. A multi-color interference filter for preventing entry of undesirable light, comprising:

a transparent base support, at least two interference filters, having different spectral characteristics, closely connected and horizontally adjacent to each other and cemented to said transparent base support, each of said interference filters comprising a transparent base plate and a multi-coated interference layer of dielectric substances deposited on said transparent base plate; and extinction members applied between said interference filters;

wherein said transparent base support has a multi-coated anti-reflection layer deposited on one surface opposite to a surface to which said interference filter is cemented.

12. A multi-color interference filter for preventing entry of undesirable light, comprising:

a transparent base support;

at least two interference filters, having different spectral characteristics, closely connected and horizontally adjacent to each other and cemented to said transparent base support, each of said interference filters comprising a transparent base plate and a multi-coated interference layer of dielectric substances deposited on said transparent base plate; and extinction members applied between said interference filters;

wherein said extinction member is a thin film painted on a side surface of said transparent base plate of each said interference filter.

13. A multi-color interference filter as defined in claim 12, wherein said thin film painted to said side surface of said transparent base plate is colored black.

14. A multi-color interference filter as defined in claim 12, wherein said thin film painted to said side surface of said transparent base plate of each said interference filter is colored substantially the same color as that of light passed through said interference filter.

15. A multi-color interference filter for preventing entry of undesirable light, comprising:

a transparent base support;

at least two interference filters, having different spectral characteristics, closely connected and horizontally adjacent to each other and cemented to said transparent base support, each of said interference filters comprising a transparent base plate and a multi-coated interference layer of dielectric substances deposited on said transparent base plate; and extinction members applied between said interference filters;

wherein said extinction member is a thin sheet disposed between said side surfaces of said transparent base plates of said two interference filters; and wherein said thin sheet is colored black.

* * * * *